US010394763B2

(12) United States Patent
Srikanth et al.

(10) Patent No.: US 10,394,763 B2
(45) Date of Patent: Aug. 27, 2019

(54) METHOD AND DEVICE FOR GENERATING PILEUP FILE FROM COMPRESSED GENOMIC DATA

(71) Applicant: Samsung Electronics Co., Ltd., Suwon-si, Gyeonggi-do (KR)

(72) Inventors: Mallavarapu Rama Srikanth, Bangalore (IN); Ravi Dutt Singh, Luknow (IN); Ajit Shyamsunder Bopardikar, Bangalore (IN); Taejin Ahn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 563 days.

(21) Appl. No.: 15/158,075

(22) Filed: May 18, 2016

(65) Prior Publication Data

US 2016/0342615 A1 Nov. 24, 2016

(30) Foreign Application Priority Data

May 19, 2015 (IN) ........................... 2510/CHE/2015
Mar. 3, 2016 (KR) ........................ 10-2016-0025763

(51) Int. Cl.
*G06F 17/00* (2019.01)
*G06F 17/22* (2006.01)
*G06F 16/17* (2019.01)
*G06F 16/16* (2019.01)

(52) U.S. Cl.
CPC .......... *G06F 16/1724* (2019.01); *G06F 16/16* (2019.01)

(58) Field of Classification Search
CPC .. G06F 21/78; G06F 21/6227; G06F 16/1744; G06F 11/2094
See application file for complete search history.

(56) References Cited

U.S. PATENT DOCUMENTS

| | | | | |
|---|---|---|---|---|
| 10,090,857 | B2 * | 10/2018 | Bhola | H03M 7/40 |
| 2012/0059670 | A1 | 3/2012 | Sanborn et al. | |
| 2012/0095693 | A1 * | 4/2012 | Ganeshalingam | G06F 17/30312 702/19 |
| 2013/0031092 | A1 * | 1/2013 | Bhola | H03M 7/46 707/737 |
| 2013/0166518 | A1 * | 6/2013 | Mande | G16B 30/00 707/693 |
| 2013/0204851 | A1 | 8/2013 | Bhola et al. | |

OTHER PUBLICATIONS

Dan Kobolt, "5 Things to Know About SAMtools Mpileup", Mar. 2, 2012 , MassGenomics.org, pp. 1-2. (Year: 2012).*
(Continued)

*Primary Examiner* — Ariel Mercado
(74) *Attorney, Agent, or Firm* — Leydig, Voit & Mayer, Ltd.

(57) ABSTRACT

Provided are a method and apparatus for generating a pileup file from a reference-based compression file. The method includes receiving a reference-based compression file comprising a plurality of pieces of read data that are compressed, partially decompressing the plurality of pieces of read data to acquire a differential string associated with the plurality of pieces of read data, and generating the pileup file by decoding the differential string based on a plurality of conversion rules.

14 Claims, 15 Drawing Sheets

(56) References Cited

OTHER PUBLICATIONS

"Next Generation Sequencing (NGS)/Alignment," downloaded from https://en.wikibooks.org/wiki/Next_Generation_Sequencing_(NGS)/Alignment on Jan. 10, 2019, 8 pages (Feb. 20, 2018).
"Bowtie an ultrafast memory-efficient short read aligner," downloaded from http://bowtie-bio.sourceforge.net/index.shtml on Jan. 1, 2019, 5 pages (Dec. 11, 2017).
"Burrows-Wheeler Aligner," downloaded from http://bio.bwa.sourceforge.net/ on Jan. 10, 2019, 2 pages (Feb. 20, 2010).

* cited by examiner

| Position | 1024 | 1025 | 1026 | 1027 | 1028 | 1029 | 1030 | 1031 | 1032 | 1033 | 1034 | 1035 | 1036 |
|---|---|---|---|---|---|---|---|---|---|---|---|---|---|
| Reference | A | T | C | G | C | T | A | A | A | C | A | T | T |

404a

| Read | A | A | A | C | T | C | G | A | A | T | C | G | A | A | T | T |
|---|---|---|---|---|---|---|---|---|---|---|---|---|---|---|---|---|
| Quality | 2 | @ | 2 | # | = | + | p | q | r | t | · | – | ^ | – | y | z |

406a

| Position | 1024 | 1025 | 1026 | 1027 | 1028 | | | 1029 | 1030 | 1031 | 1032 | | | 1033 | 1034 | 1035 | 1036 |
|---|---|---|---|---|---|---|---|---|---|---|---|---|---|---|---|---|---|
| Reference | A | T | C | G | C | – | – | T | A | A | A | – | – | C | A | T | T |
| Read | C | · | · | · | A | A | T | C | G | * | * | A | A | * | * | · | · |
| Quality | # | = | + | p | q | r | t | · | – | | | ^ | – | | | y | z |

408a

| CIGAR | 3S | 5M | 2I | 2M | 2D | 2I | 2D | 2M |
|---|---|---|---|---|---|---|---|---|
| diff String | 0@AAA | 0SC 3SA | 0IAT | 0SCG | 0D2 | 0IAA | 0D2 | – |

| Position | 1024 | 1025 | 1026 | 1027 | 1028 | 1029 | 1030 | 1031 | 1032 | 1033 | 1034 | 1035 | 1036 |
|---|---|---|---|---|---|---|---|---|---|---|---|---|---|
| Reference | A | T | C | G | C | T | A | A | A | C | A | T | T |

404a

| Read | A | A | A | C | T | C | G | A | A | T | C | G | A | A | T | T |
|---|---|---|---|---|---|---|---|---|---|---|---|---|---|---|---|---|
| Quality | 2 | @ | 2 | # | = | + | p | q | r | t | · | – | ^ | – | y | z |

FIRST STEP :
Differential String(408a): 0@AAA 0SC 3SA 0IAT 0SCG 0D2 0IAA 0D2
Position on reference: 1024

402b

| Position | Reference | Read base information | Quality information |
|---|---|---|---|
| 1024 | A | ^0 | |
| 1025 | | | |
| 1026 | | | |
| 1027 | | | |
| 1028 | | | |
| 1029 | | | |
| 1030 | | | |
| 1031 | | | |
| 1032 | | | |
| 1033 | | | |
| 1034 | | | |
| 1035 | | | |
| 1036 | | | |

PROCESSED BASES = 0

| Position | 1024 | 1025 | 1026 | 1027 | 1028 | 1029 | 1030 | 1031 | 1032 | 1033 | 1034 | 1035 | 1036 |
|---|---|---|---|---|---|---|---|---|---|---|---|---|---|
| Reference | A | T | C | G | C | T | A | A | A | C | A | T | T |

404a

| Read | A | A | A | C | T | C | G | A | A | T | C | G | A | A | T | T |
|---|---|---|---|---|---|---|---|---|---|---|---|---|---|---|---|---|
| Quality | 2 | @ | 2 | # | = | + | p | q | r | t | · | – | ^ | – | y | z |

SECOND STEP :
Differential String(408a): 0@AAA 0SC 3SA 0IAT 0SCG 0D2 0IAA 0D2
Position on reference: 1024

402b

| Position | Reference | Read base information | Quality information |
|---|---|---|---|
| 1024 | A | ^0 | |
| 1025 | | | |
| 1026 | | | |
| 1027 | | | |
| 1028 | | | |
| 1029 | | | |
| 1030 | | | |
| 1031 | | | |
| 1032 | | | |
| 1033 | | | |
| 1034 | | | |
| 1035 | | | |
| 1036 | | | |

PROCESSED BASES = 3

| Position | 1024 | 1025 | 1026 | 1027 | 1028 | 1029 | 1030 | 1031 | 1032 | 1033 | 1034 | 1035 | 1036 |
|---|---|---|---|---|---|---|---|---|---|---|---|---|---|
| Reference | A | T | C | G | C | T | A | A | A | C | A | T | T |

404a

| Read | A | A | A | C | T | C | G | A | A | T | C | G | A | A | T | T |
|---|---|---|---|---|---|---|---|---|---|---|---|---|---|---|---|---|
| Quality | 2 | @ | 2 | # | = | + | p | q | r | t | · | – | ^ | – | y | z |

THIRD STEP :
Differential String(408a): 0@AAA 0SC 3SA 0IAT 0SCG 0D2 0IAA 0D2
Position on reference: 1024

402b

| Position | Reference | Read base information | Quality information |
|---|---|---|---|
| 1024 | A | ^0C | # |
| 1025 | | | |
| 1026 | | | |
| 1027 | | | |
| 1028 | | | |
| 1029 | | | |
| 1030 | | | |
| 1031 | | | |
| 1032 | | | |
| 1033 | | | |
| 1034 | | | |
| 1035 | | | |
| 1036 | | | |

PROCESSED BASES = 4

| Position | 1024 | 1025 | 1026 | 1027 | 1028 | 1029 | 1030 | 1031 | 1032 | 1033 | 1034 | 1035 | 1036 |
|---|---|---|---|---|---|---|---|---|---|---|---|---|---|
| Reference | A | T | C | G | C | T | A | A | A | C | A | T | T |

404a

| Read | A | A | A | C | T | C | G | A | A | T | C | G | A | A | T | T |
|---|---|---|---|---|---|---|---|---|---|---|---|---|---|---|---|---|
| Quality | 2 | @ | 2 | # | = | + | p | q | r | t | · | − | ^ | − | y | z |

FOURTH STEP :

Differential String(408a): 0@AAA 0SC 3SA 0IAT 0SCG 0D2 0IAA 0D2

Position on reference: 1024

402b

| Position | Reference | Read base information | Quality information |
|---|---|---|---|
| 1024 | A | ^0C | # |
| 1025 | T | · | = |
| 1026 | C | · | + |
| 1027 | G | · | p |
| 1028 | C | A | q |
| 1029 | | | |
| 1030 | | | |
| 1031 | | | |
| 1032 | | | |
| 1033 | | | |
| 1034 | | | |
| 1035 | | | |
| 1036 | | | |

PROCESSED BASES = 8

| Position | 1024 | 1025 | 1026 | 1027 | 1028 | 1029 | 1030 | 1031 | 1032 | 1033 | 1034 | 1035 | 1036 |
|---|---|---|---|---|---|---|---|---|---|---|---|---|---|
| Reference | A | T | C | G | C | T | A | A | A | C | A | T | T |

404a

| Read | A | A | A | C | T | C | G | A | A | T | C | G | A | A | T | T |
|---|---|---|---|---|---|---|---|---|---|---|---|---|---|---|---|---|
| Quality | 2 | @ | 2 | # | = | + | p | q | r | t | · | – | ^ | – | y | z |

FIFTH STEP :
Differential String(408a): 0@AAA 0SC 3SA 0IAT 0SCG 0D2 0IAA 0D2
Position on reference: 1029

402b

| Position | Reference | Read base information | Quality information |
|---|---|---|---|
| 1024 | A | ^0C | # |
| 1025 | T | · | = |
| 1026 | C | · | + |
| 1027 | G | · | p |
| 1028 | C | A+2AT | qrt |
| 1029 | | | |
| 1030 | | | |
| 1031 | | | |
| 1032 | | | |
| 1033 | | | |
| 1034 | | | |
| 1035 | | | |
| 1036 | | | |

PROCESSED BASES = 10

| Position | 1024 | 1025 | 1026 | 1027 | 1028 | 1029 | 1030 | 1031 | 1032 | 1033 | 1034 | 1035 | 1036 |
|---|---|---|---|---|---|---|---|---|---|---|---|---|---|
| Reference | A | T | C | G | C | T | A | A | A | C | A | T | T |

404a

| Read | A | A | A | C | T | C | G | A | A | T | C | G | A | A | T | T |
|---|---|---|---|---|---|---|---|---|---|---|---|---|---|---|---|---|
| Quality | 2 | @ | 2 | # | = | + | p | q | r | t | · | – | ^ | – | y | z |

SIXTH STEP :
Differential String(408a): 0@AAA 0SC 3SA 0IAT 0SCG 0D2 0IAA 0D2
Position on reference: 1029

402b

| Position | Reference | Read base information | Quality information |
|---|---|---|---|
| 1024 | A | ^0C | # |
| 1025 | T | · | = |
| 1026 | C | · | + |
| 1027 | G | · | p |
| 1028 | C | A+2AT | qrt |
| 1029 | T | C | · |
| 1030 | A | G | – |
| 1031 | | | |
| 1032 | | | |
| 1033 | | | |
| 1034 | | | |
| 1035 | | | |
| 1036 | | | |

PROCESSED BASES = 12

| Position | 1024 | 1025 | 1026 | 1027 | 1028 | 1029 | 1030 | 1031 | 1032 | 1033 | 1034 | 1035 | 1036 |
|---|---|---|---|---|---|---|---|---|---|---|---|---|---|
| Reference | A | T | C | G | C | T | A | A | A | C | A | T | T |

404a

| Read | A | A | A | C | T | C | G | A | A | T | C | G | A | A | T | T |
|---|---|---|---|---|---|---|---|---|---|---|---|---|---|---|---|---|
| Quality | 2 | @ | 2 | # | = | + | p | q | r | t | · | – | ^ | – | y | z |

SEVENTH STEP :
Differential String(408a): 0@AAA 0SC 3SA 0IAT 0SCG 0D2 0IAA 0D2
Position on reference: 1031

402b

| Position | Reference | Read base information | Quality information |
|---|---|---|---|
| 1024 | A | ^0C | # |
| 1025 | T | · | = |
| 1026 | C | · | + |
| 1027 | G | · | p |
| 1028 | C | A+2AT | qrt |
| 1029 | T | C | · |
| 1030 | A | G-2AA | -!! |
| 1031 | A | * | ! |
| 1032 | A | * | ! |
| 1033 | | | |
| 1034 | | | |
| 1035 | | | |
| 1036 | | | |

PROCESSED BASES = 12

| Position | 1024 | 1025 | 1026 | 1027 | 1028 | 1029 | 1030 | 1031 | 1032 | 1033 | 1034 | 1035 | 1036 |
|---|---|---|---|---|---|---|---|---|---|---|---|---|---|
| Reference | A | T | C | G | C | T | A | A | A | C | A | T | T |

404a

| Read | A | A | A | C | T | C | G | A | A | T | C | G | A | A | T | T |
|---|---|---|---|---|---|---|---|---|---|---|---|---|---|---|---|---|
| Quality | 2 | @ | 2 | # | = | + | p | q | r | t | · | – | ^ | – | y | z |

EIGHTH STEP :
Differential String(408a): 0@AAA 0SC 3SA 0IAT 0SCG 0D2 0IAA 0D2
Position on reference: 1033

402b

| Position | Reference | Read base information | Quality information |
|---|---|---|---|
| 1024 | A | ^0C | # |
| 1025 | T | · | = |
| 1026 | C | · | + |
| 1027 | G | · | p |
| 1028 | C | A+2AT | qrt |
| 1029 | T | C | · |
| 1030 | A | G-2AA | -!! |
| 1031 | A | * | ! |
| 1032 | A | *+2AA | !^– |
| 1033 | | | |
| 1034 | | | |
| 1035 | | | |
| 1036 | | | |

PROCESSED BASES = 14

| Position | 1024 | 1025 | 1026 | 1027 | 1028 | 1029 | 1030 | 1031 | 1032 | 1033 | 1034 | 1035 | 1036 |
|---|---|---|---|---|---|---|---|---|---|---|---|---|---|
| Reference | A | T | C | G | C | T | A | A | A | C | A | T | T |

404a

| Read | A | A | A | C | T | C | G | A | A | T | C | G | A | A | T | T |
|---|---|---|---|---|---|---|---|---|---|---|---|---|---|---|---|---|
| Quality | 2 | @ | 2 | # | = | + | p | q | r | t | · | – | ^ | – | y | z |

NINTH STEP :
Differential String(408a): 0@AAA 0SC 3SA 0IAT 0SCG 0D2 0IAA 0D2
Position on reference: 1033

402b

| Position | Reference | Read base information | Quality information |
|---|---|---|---|
| 1024 | A | ^0C | # |
| 1025 | T | · | = |
| 1026 | C | · | + |
| 1027 | G | · | p |
| 1028 | C | A+2AT | qrt |
| 1029 | T | C | · |
| 1030 | A | G-2AA | -!! |
| 1031 | A | * | ! |
| 1032 | A | *+2AA | !^– |
| 1033 | | * | ! |
| 1034 | | * | ! |
| 1035 | | | |
| 1036 | | | |

PROCESSED BASES = 14

| Position | 1024 | 1025 | 1026 | 1027 | 1028 | 1029 | 1030 | 1031 | 1032 | 1033 | 1034 | 1035 | 1036 |
|---|---|---|---|---|---|---|---|---|---|---|---|---|---|
| Reference | A | T | C | G | C | T | A | A | A | C | A | T | T |

404a

| Read | A | A | A | C | T | C | G | A | A | T | C | G | A | A | T | T |
|---|---|---|---|---|---|---|---|---|---|---|---|---|---|---|---|---|
| Quality | 2 | @ | 2 | # | = | + | p | q | r | t | · | – | ^ | – | y | z |

TENTH STEP :
Differential String(408a): 0@AAA 0SC 3SA 0IAT 0SCG 0D2 0IAA 0D2
Position on reference: 1035

402b

| Position | Reference | Read base information | Quality information |
|---|---|---|---|
| 1024 | A | ^0C | # |
| 1025 | T | · | = |
| 1026 | C | · | + |
| 1027 | G | · | p |
| 1028 | C | A+2AT | qrt |
| 1029 | T | C | · |
| 1030 | A | G-2AA | –!! |
| 1031 | A | * | ! |
| 1032 | A | *+2AA | !^– |
| 1033 | A | * | ! |
| 1034 | C | * | ! |
| 1035 | T | · | y |
| 1036 | T | .$ | z |

PROCESSED BASES = 16

METHOD AND DEVICE FOR GENERATING PILEUP FILE FROM COMPRESSED GENOMIC DATA

CROSS-REFERENCE TO RELATED APPLICATIONS

This application claims the benefit of Indian Patent Application No. 2510/CHE/2015, filed on May 19, 2015, in the Office of the Controller General of Patents, Designs, and Trademarks of India, and Korean Patent Application No. 10-2016-0025763, filed on Mar. 3, 2016, in the Korean Intellectual Property Office, the disclosures of which are incorporated herein in their entireties by reference.

BACKGROUND

1. Field

The present disclosure relates to data compression in next generation sequencing (NGS) in general, and more particularly to a mechanism for generating a pileup file from compressed NGS genomic data.

2. Description of the Related Art

In computational biology, next generation sequencing (NGS) refers to new, high-throughput technology for sequencing DNA or RNA. NGS may be used to analyze the genome of an individual or a collection of individuals to, for example, comprehensively catalog genetic variation in population samples. The NGS-based diagnostics may have a significant impact on prescribing effective treatment to an individual. Such personalization is often based on a set of mutations obtained from analyzing an individual's DNA data through an NGS analysis pipeline. The mutations that characterize the individual's disease help clinicians tailor therapy to that individual. Typically, the NGS methods amplify the DNA molecule being sequenced and divide the replicates into smaller strands called reads (made up of few tens to few thousands of contiguous base pairs). These reads are sequenced and the output is stored in a FASTQ file (unaligned NGS sequence reads+quality data is stored in a FASTQ file).

To analyze the genomic data obtained through NGS sequencing, the reads are first aligned to a reference (indicates a reference standard of the genomic data, which may be understood as the genomic data that represents each species) and then stored in a Sequence Alignment Map (SAM) file. Corresponding to each read, the SAM file has multiple fields such as the read sequence, quality values, read-level quality value, alignment location relative to the reference and a Compact Idiosyncratic Gapped Alignment Report (CIGAR) string. The CIGAR string contains a presentation of differences between the read and the reference. The SAM file may range from several megabytes (MBs) to gigabytes (GBs) in size. Analysis of the genomic data requires steps such as variation calling, which requires a pileup file of the genomic data to be analyzed.

In general, analysis or processing of compressed genomic data such as pileup file generation and variation calling is performed on a binary SAM file called a Binary Alignment Map (BAM) file. The BAM file size may increase up to a few MBs to a few GBs. In the case that the SAM data is compressed, in order to perform variation calling and generate a pileup file, the compressed genomic data of the SAM file is first decompressed and then converted into the BAM format before invoking the pileup and variation calling. This consumes a large amount of memory space and processing power, thereby increasing time for genomic data analysis.

SUMMARY

Provided are a method and device for generating a pileup file from a reference based compression file that compresses next generation sequencing (NGS) read information relative to a reference. The pileup file is generated by decompressing one or more reads from the reference based compression file. The decompression is partial decompression.

Also provided is a method of partially decompressing one or more reads by obtaining differential strings corresponding to each of the reads.

Also provided is a method of generating a pileup file by decoding the differential strings using one or more conversion rules.

Additional aspects will be set forth in part in the description which follows and, in part, will be apparent from the description, or may be learned by practice of the presented embodiments.

According to an embodiment, a method of generating a pileup file includes receiving a reference based compression file including a plurality of pieces of read data that are compressed; partially decompressing the plurality of pieces of read data to acquire a differential string associated with the plurality of pieces of read data; and generating the pileup file by decoding the differential string based on a plurality of conversion rules.

According to another embodiment, an apparatus for generating a pileup file includes a memory configured to store at least one instruction; and a processor configured to execute the at least one instruction stored in the memory. The processor is configured to receive a reference based compression file including a plurality of pieces of read data that are compressed, partially decompress the plurality of pieces of read data to acquire a differential string associated with the plurality of pieces of read data, and generate the pileup file by decoding the differential string based on a plurality of conversion rules.

According to yet another embodiment, a non-transitory computer-readable recording medium having recorded thereon a program, which, when executed by a computer, performs the method of generating a pileup file, which includes receiving a reference based compression file including a plurality of pieces of read data that are compressed; partially decompressing the plurality of pieces of read data to acquire a differential string associated with the plurality of pieces of read data; and generating the pileup file by decoding the differential string based on a plurality of conversion rules.

BRIEF DESCRIPTION OF THE DRAWINGS

These and/or other aspects will become apparent and more readily appreciated from the following description of the embodiments, taken in conjunction with the accompanying drawings in which:

FIG. 4A is a diagram of an example of read data for generating a pileup string, according to an embodiment;

FIGS. 4B to 4K are exemplary diagrams describing a method of generating a pileup string for a read based on conversion rules, according to an embodiment.

DETAILED DESCRIPTION

Figure 1:
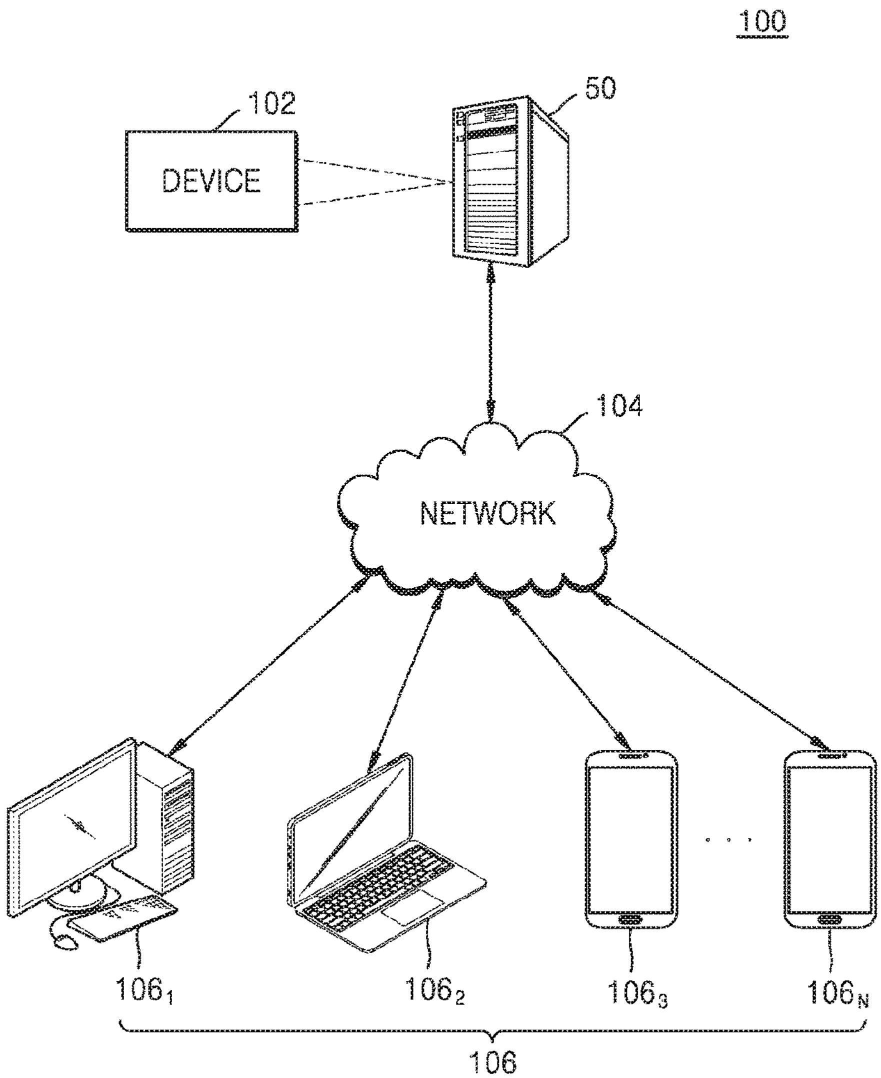
FIG. 1 is a diagram describing a network implementation of a device for generating a pileup file (pileup string) from a reference based compression file including a reference based compressed genomic data, according to an embodiment.

Terms used herein are selected as general terms used currently as widely as possible considering the functions in the present disclosure, but they may depend on the intentions of one of ordinary skill in the art, legal practice, the appearance of new technologies, etc. In some cases, terms arbitrarily selected by the applicant are also used, and in such cases, their meaning will be described in detail. Thus, it should be noted that the terms used in the specification should be understood not based on their literal names but by their given definitions and descriptions as used throughout the specification.

It will be further understood that the terms "comprises" and/or "comprising" used herein specify the presence of stated features or components, but do not preclude the presence or addition of one or more other features or components. In addition, the terms such as "unit," "-er(-or)," and "module" described in the specification refer to an element for performing at least one function or operation, and may be implemented in hardware, software, or the combination of hardware and software.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the embodiments below, a method and device for generating a pileup file (pileup string) from a reference-based compression file will be described. The reference based compression file is typically based on a reference based next generation sequencing (NGS) data compression, in which sequencing is a process of determining the nucleotide order of a given DNA string. The reference-based compression file includes a plurality of pieces of NGS read data (reads). The NGS read data is represented as a differential string relative to a reference sequence. The read data includes spliced overlapping fragments of an amplified DNA strand or string that is to be sequenced. After sequencing, the read data is aligned to matching locations on the reference. The differential string provides difference information of the read with respect to the reference sequence where the read data aligns. The differential string is encoded along with other components of a Sequence Alignment Map (SAM) file for the read data which include, but are not limited to, quality values associated with a base of the read data as well as quality values (quality vectors) of the read data. The read data is completely defined by the reference sequence and the differential string in the reference based compression file using the reference-based NGS data compression.

A method of generating the pileup file according to an embodiment includes obtaining the differential string corresponding to the read data. The generating of the pileup file from the differential string may be performed using one or more conversion rules. Also, the generated pileup file may be used for a plurality of applications. For example, the pileup file may be used in variation calling.

Current pileup file generation methods require complete decompression or reconstruction of compressed read data in a SAM file and conversion to a stored BAM format. However, the method and device of generating the pileup file according to an embodiment do not require the complete decompression or reconstruction of the read data. The pileup file is generated by decompressing compression information to obtain a differential string for every read from a reference based compression file. The differential string may be obtained by partial decompression of read data. Compared to complete decompression or reconstruction of the read data, partial decompression of the read data may provide higher time efficiency for pileup file generation and reduce space complexity.

In an embodiment, usage of a reference-based compression mechanism that compresses the entire genome with random access may provide partial decompression of selective regions only. Also, even when the entire genome data has to be accessed from the reference based compression file, less memory may be utilized in comparison to current methods that uses an equivalent BAM file. This is due to efficient compression and partial decompression of the read data.

Hereinafter, the present embodiments will be described with reference to FIGS. 1 to 5. In the drawings, like reference numerals denote like elements.

FIG. 1 is a diagram describing a network implementation 100 including a device 102 for generating a pileup file (pileup string) from a reference-based compression file including a reference-based compressed genomic data, according to an embodiment. A device 102 according to an embodiment may be implemented as an application or module for executing a set of instructions on a server 50. The device 102 may be implemented in a variety of computing systems, such as a laptop computer, a desktop computer, a notebook, a workstation, a server, a network server, an electronic device, and the like. In an embodiment, the device 102 may be implemented in a cloud-based environment. The device 102 may be accessed by multiple users through one or more user devices 106$_1$ to 106$_N$ (hereinafter, the one or more user devices 106$_1$ to 106$_N$ will be collectively referred to as user devices 106) or through applications of the user devices 106. For example, the user devices 106 may include, but are not limited to, a portable computer, a personal digital assistant (PDA), a hand-held device, and a workstation. The user devices 106 may communicate with the device 102 via a network 104.

In an embodiment, the network 104 may be a wireless network, a wired network, or a combination thereof. The network 104 may be implemented as one of different types of networks, such as an intranet, a local area network (LAN), a wide area network (WAN), the Internet, and the like.

Figure 2:
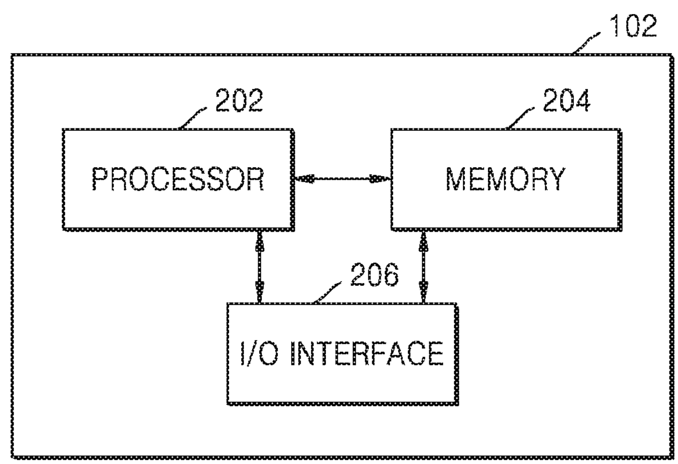
FIG. 2 is a block diagram of a device for generating a pileup file, according to an embodiment.

FIG. 2 is a block diagram of the device 102 for generating a pileup file, according to an embodiment. Referring to FIG. 2, the device 102 may include a processor 202, and an input/output (I/O) interface 206. The device 102 may further include a memory unit 204 storing various code modules to be executed by the processor 202. The device 102 may be configured to allow the processor 202 to access the reference-based compression file. In an embodiment, the device 102 may receive the reference-based compression file from any other storage device through the I/O interface 206. The reference-based compression file may include a plurality of pieces of read data or reads stored as the differential string. The device 102 according to an embodiment may generate the differential string associated with each piece of read data included in the reference-based compression file.

The device 102 may generate the pileup file by partially decompressing the plurality of pieces of read data included in the reference-based compression file. Also, the device 102 may generate the pileup file by decoding the differential string of each piece of the read data based on a plurality of conversion rules. The conversion rules will be described later with reference to FIGS. 3 and 4A to 4K. The generated pileup file may be stored in the memory unit 204 or any other storage device and used in various applications. For example, the generated pileup file may be used for, but is not limited to, variation calling.

FIG. 2 is the block diagram of an embodiment the device 102 for generating the pileup file. The components shown in the block diagram may be combined, include additional components, or omit some component(s) according to the actual implementation of the device 102. That is, two or more components may be combined or one component may be separated into two or more components if necessary. Also, functions performed by each block are merely for describing embodiments. Specific operations or devices do not limit the scope of the inventive concept. Furthermore, the device 102 may include various other modules or components. Also, the device 102 may include various modules and components interacting locally or remotely along with other hardware or software components to communicate with each other. For example, the components may include, but are not limited to, a process running in a controller or a processor, an object, an executable process, a thread of execution, a program, or a computer.

Figure 3:
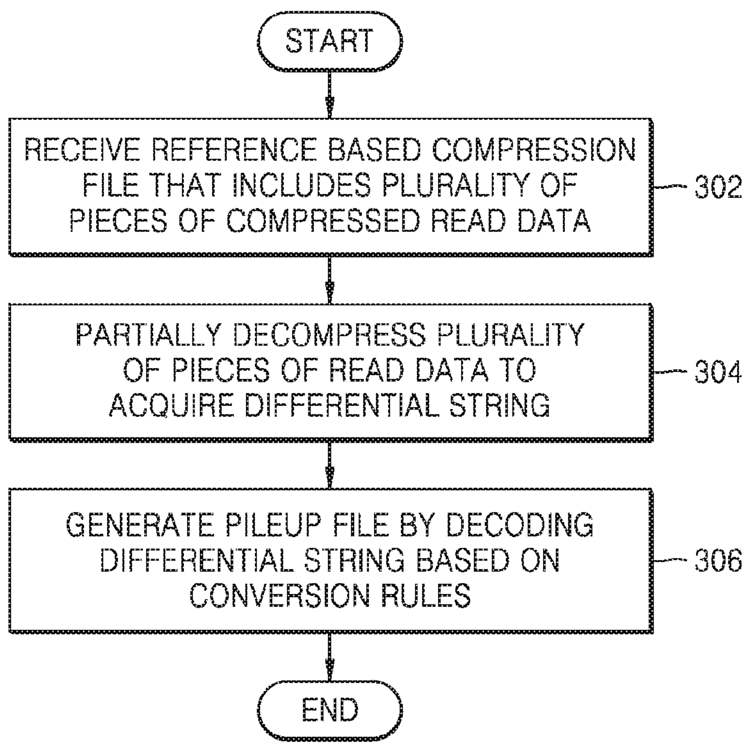
FIG. 3 is a flowchart of a method of generating a pileup file from a reference based compression file including reference based compressed genomic data, according to an embodiment.

FIG. 3 is a flowchart of a method of generating a pileup file from a reference-based compression file including reference-based compressed genomic data, according to an embodiment. Referring to FIG. 3, in operation 302, the method of generating the pileup file according to an embodiment includes receiving the reference-based compression file (compressed genetic information) as an input. The reference-based compression file includes a plurality of pieces of read data that are stored by using a reference-based compression mechanism. In an embodiment, the reference-based compression mechanism may be NGS compressed data that includes the plurality of pieces of read data represented as differential strings. In operation 304, the method of generating the pileup file according to an embodiment includes decompressing the plurality of pieces of read data of the reference-based compression file by generating a differential string associated with each piece of the read data. Unlike methods of the related art that include completely decompressing the reads to generate the pileup file, the differential string is generated by partially decompressing the read data. In operation 306, the method of generating the pileup file according to an embodiment includes generating the pileup file by decoding the differential string of each piece of the read data based on one or more conversion rules. The conversion rules may enable decoding of each segment of the differential string associated with each piece of read data that may be required for generating the pileup file. The conversion rules will be described later. The generated pileup file may be a standard pileup file that includes a plurality of fields corresponding to each of the decoded differential strings. The plurality of fields may include a position field of the read data relative to a reference, a reference field (reference read data), a read base information field (a vector of matches and mismatches), and a quality information field (quality vector). A length of the vector at each position is approximately equivalent to a depth of the SAM file. The quality vector represents quality values corresponding to strings in vector fields. An example pileup string corresponding to a particular read is shown in Table 1 below.

TABLE 1

| Position | Reference | Read Base Information | Quality Information |
|---|---|---|---|
| 1024 | A | . . . A$A | -@23567 |

The generated pileup file may be used for a plurality of applications including, but not limited to, variation calling.

The device 102 according to an embodiment may generate the pileup file based on partial decompression of the reads by performing the method of generating the pileup file including operations 302 to 306.

Various operations, actions, blocks, steps, and the like of the method of generating the pileup file may be performed in the aforementioned order, in a different order, or simultaneously. According to another embodiment, some operations, actions, blocks, steps, and the like may be omitted, added, modified, and the like without departing from the scope of the inventive concept.

FIG. 4A is a diagram of an example of read data for generating a pileup string, according to an embodiment. FIG. 4A shows alignments of read data with respect to a reference, according to an embodiment. FIG. 4A shows a reference **402*a*, a read 404*a*, a read 406*a* in alignment with respect to the reference, and a CIGAR and a differential string 408*a***. The CIGAR string is used to store differences of the read and the reference in an existing SAM file format. The CIGAR may also be viewed as a differential string, but does not include information on specific changes such as substitutions and mismatches as well as locations of such changes in the read with respect to the equivalent position on the reference.

The reference **402*a* is used as a reference sequence for the read 404*a* to generate a reference-based compression file. Difference information between the reference 402*a* and the read 404*a* is stored in the reference-based compression file as the differential string 408*a*** in addition to other read related information. In the reference-based NGS data compression, difference information may be encoded, thereby saving a considerable amount of memory. A position of a difference may be encoded using differential offsets. A type of variation between the read and the reference may be encoded followed by a nucleotide sequence (except in the case of a deletion operation). An entropy coder (e.g., an arithmetic coder) may be used for compressing each of the above parameters. The quality values may be compressed using methods relevant to compressing a set of symbols such as those used in compression of unaligned NGS data (e.g., in a FASTQ file).

The differential string that represents a difference between the read and the reference sequence may include indicators including substitution "S," insertion "I," deletion "D," and soft-clipping "@." According to an embodiment, the differential string **408*a*** may be "0@AAA 0SC 3SA 0IAT 0SCG 0D2."

The device 102 according to an embodiment may generate the pileup file by using the conversion rules to decode the differential string. The conversion rules according to an embodiment will be described below with reference to Table 2. The fields of the pileup file may include a position field (indicates a position in relation to the reference), a reference field, a read base information field, and a quality information field.

TABLE 2

| | Action |
|---|---|
| 1 | Select a segment of a differential string associated with a read and insert reference base. |
| 2 | If a segment to be decoded is a first segment of the differential string,<br>Insert a start position of the read and a corresponding reference base value in a position field and a reference field of a pileup string field.<br>Insert "^" (first symbol) in a "read base information" field to indicate start of the read.<br>Insert a quality value of the read with quality value = ASCII value of (read quality + predefined value) in the read based information field (in an embodiment, the predefined value may be 33). |
| 3 | Identify an indicator for each segment of the differential string.<br>If an indicator at a beginning of the read or an end of the read is a soft-clipping indicator "@," ignore soft-clipping and corresponding sequence. Else perform:<br>If the indicator is a substitution indicator "S,"<br>Identify one or more substitutions from the differential string.<br>At positions (on the reference) of the substitutions: Insert substitution base values from the read in the read base information field of the pileup string, insert quality values corresponding to the substitution base values in a quality information field, insert a reference base value in a reference field, insert a corresponding reference position in a position field.<br>Determine an internal state as substitution (as represented by S).<br>Increase the positions by the number of substitutions.<br>If the indicator is "I"<br>Insertion is always captured at a previous position.<br>Values of bases inserted at a current position are inserted in the read base information field, and quality values corresponding to the values are inserted in the quality information field. "+" is added in front of the values of the bases.<br>Determine the internal state as "I."<br>Position value remains unchanged.<br>If the indicator is "D,"<br>Deletions may be marked according to the following two ways.<br>If a deletion is preceded by a matching or a substitution at a previous position, put a "−" sign at the previous position followed by the number of bases deleted and actual values of the bases on the reference. Insert "*" in a read base information field corresponding to a position where the deletion has occurred. Also, "!" (ASCII = 33: Lowest quality) is inserted in quality information fields corresponding to the position where the deletion has occurred. Relevant values are inserted in the position field and the reference field.<br>If a deletion occurs after an insertion (other cases), insert "*" at a read base information field corresponding to a position where the deletion has occurred. Relevant values are inserted in the position field and the reference field. Also, "!" (ASCII = 33: Lowest quality) is inserted in quality information fields corresponding to the position where the deletion has occurred.<br>Determine the internal state as "D."<br>Internal position is increased by the number of deletions.<br>Change or maintain internal state<br>Change position<br>Matches are indicated by inserting "." into the read base information field, and corresponding quality values into the quality information field. Also, relevant values are inserted in the position field and the reference field.<br>At the end of a read, "$" (second symbol) is inserted at a last entry of the read base information field. |

FIGS. 4B to 4K are exemplary diagrams describing a method of generating a pileup string for the read 404*a* based on the conversion rules, according to an embodiment.

FIG. 4B illustrates a first step for generating a pileup string 402*b* for the read 404*a* based on the reference 402*a* shown in FIG. 4B. The differential string 408*a* for the read 404*a* is shown as "0@AAA 0SC 3SA 0IAT 0SCG 0D2 0IAA 0D2." As 1024 is a start position of the reference 402*a*, the device 102 may insert "^" indicating start of the read 404*a* in the read base information field, and a base "A" in a reference field of the pileup string 402*b*. Also, the device 102 inserts a quality value (0) in the read base information field. The quality value is calculated based on 'quality value=ASCII (value of read+33).

FIG. 4C illustrates a second step for generating the pileup string 402*b* for the read 404*a* based on the reference 402*a* shown in FIG. 4C. A segment "0@AAA" of the differential string 408*a* indicates soft-clipping "@" of AAA bases at an index 0 from the start position 1024 of the reference 402*a*. According to the conversion rules of Table 2, soft-clipping is ignored at the beginning and the end of the read. Also, an internal state is marked as @, and a position on reference remains at 1024.

FIG. 4D illustrates a third step for generating the pileup string 402*b* for the read 404*a* based on the reference 402*a* of FIG. 4D. A segment "0SC" of the differential string 408*a* indicates substitution of a base C at a previously changed position 1024. Also, a quality value may be inserted to a quality information field corresponding to the position 1024. For example, as shown in FIG. 4D, the device 102 may insert a quality value '#' corresponding to the base C in the quality information field. Also, a position on the reference may be increased by 1 (the number of substitution) from 1024 to 1025.

FIG. 4E illustrates a fourth step for generating the pileup string 402*b* for the read 404*a* based on the reference 402*a* of FIG. 4E. Two sub steps may be performed for a segment "3SA" of the differential string 408*a*. In a first sub step, the segment "3SA" indicates that there are three matches at positions 1025, 1026, and 1027 on the reference 402*a*. Accordingly, the device 102 may insert "." in the read base information fields corresponding to the positions 1025, 1026, and 1027. Also, the device 102 may insert quality values "=", "+", and "p" that respectively correspond to bases T, C, and G in the quality information fields respectively corresponding to the positions 1025, 1026, and 1027. The device 102 may determine the internal state as 'M' and change the position on the reference from 1024 to 1027.

Also, in a second sub step, the segment "3SA" indicates that a base C is substituted with a base A at a position 1028 on the reference 402*a*. In the second sub step, the device 102 may insert a quality value (e.g., q) of a substituted base (e.g., base A) in the quality information field. Also, the device 102 may mark the internal state as 'S,' and change the position on the reference from 1028 to 1029.

FIG. 4F illustrates a fifth step for generating the pileup string 402*b* for the read 404*a* based on the reference 402*a* of FIG. 4F. A segment "0IAT" of the differential string 408*a* indicates insertion "I" of two bases A and T at a position 1029. Since insertion is always captured at a previous position according to the conversion rules, A and T are inserted at 1028, which is the previous position of a current position, that is, the position 1029. In this case, as shown in FIG. 4F, "+" is added in front of A and T. Also, quality information at the position 1029 is updated, and 'r' and 't' respectively corresponding to A and T are added to the quality information field, as shown in FIG. 4F. Also, the device 102 marks the internal state as "I," and maintains the position on the reference at 1029.

FIG. 4G illustrates a sixth step for generating the pileup string 402*b* for the read 404*a* based on the reference 402*a* of FIG. 4G. A segment "0SCG" of the differential string 408*a* indicates substitution of two bases C and G. As shown in FIG. 4G, the device 102 marks substitution of the base C at a read base information field corresponding to the position 1029, and marks substitution of the base G at a read base information field corresponding to a position 1030. Also, the device 102 may update quality information of each position, and mark the internal state as "S." Also, the device 102 may change the position on reference by increasing 1029 by the number of substituted bases, i.e., two.

FIG. 4H illustrates a seventh step for generating the pileup string 402*b* for the read 404*a* based on the reference 402*a* of FIG. 4H. A segment "0D2" of the differential string 408*a* indicates that there is a deletion of two bases at a position that is zero distance apart from a position 1031. The deletion may be marked in two ways. A first way may be used when the deletion is preceded by "M" (match) or "S" (substitution). The first way indicates that, when the number of deleted bases is 'n,''–n' and a deleted base value may be inserted in a read base information field corresponding to a previous position. Also, "*" may be marked at a read base information field corresponding to a position where the deletion occurred, and "!" may be inserted in a quality information field corresponding to the position where the deletion occurred. A second way may be used for all other cases expect for when the deletion is preceded by "M" or "S." According to the second way, "*" may be marked at a position where the deletion occurred, and "!" may be inserted in a quality information field corresponding to the position where the deletion occurred.

For the segment "0D2" of the differential string 408*a*, the first way may be used because a substitution has been previously performed. The device 102 may identify reference bases (in this case, A and A) at the position 1031 and the position 1032. According to the first way, the device 102 may insert –2AA in a read base information field corresponding to the previous position 1030. Also, the device 102 may insert "*" in read base information fields corresponding to the positions 1031 and 1032, and insert "!" in quality information fields corresponding to the positions 1031 and 1032. Also, the position on reference may be increased from 1031 by the number of deleted bases, i.e., two, and changed to 1033, and the internal state may be marked as "D."

FIG. 4I illustrates an eighth step for generating the pileup string 402*b* for the read 404*a* based on the reference 402*a* of FIG. 4I. A segment "0IAA" of the differential string 408*a* indicates an insertion of two bases A and A at a position that is zero distance apart from the position 1033. Since insertion is always captured at a previous position according to the conversion rules, A and A are inserted at 1032, which is the previous position of a current position, that is, the position 1033. In this case, as shown in FIG. 4I, "+" is added in front of A and A. Also, quality information at the position 1033 is updated, and '√^' and '–' respectively corresponding to A and A are added to the quality information field, as shown in FIG. 4I. Also, the internal state is marked as "I," and the position on the reference is maintained at 1033.

FIG. 4J illustrates a ninth step for generating the pileup string 402*b* for the read 404*a* based on the reference 402*a* of FIG. 4J. A segment "0D2" of the differential string 408*a* indicates a deletion of two bases, and the device 102 may identify two bases at the position 1033 and a position 1034. Since the insertion has been previously performed for the segment "0D2," the second way of deletion may be used. According to the second way, the device 102 may insert "*" in read base information fields corresponding to the position 1033 and 1034, and insert "!" in quality information fields corresponding to the positions 1033 and 1034. Also, the device 102 may change the position on reference to 1035 from 1033 by increasing by the number of deleted bases, i.e., two, and mark the internal state as "D."

FIG. 4K illustrates a tenth step for generating the pileup string 402*b* for the read 404*a* based on the reference 402*a* of FIG. 4K. In this case, the position on the reference is 1035, and no segments in the differential string may be left to be processed. However, the number of reads processed is fourteen while a known read length is sixteen. Therefore, the number of bases left to be processed is two (16–14=2). In this case, when the number of bases left to be processed is greater than 0, the device 102 may perform a "match" operation for every base left to be processed. For example, the device 102 may insert "." in a base information field corresponding to the remaining reference and insert a quality value corresponding to a reference base in a quality information field. Also, as shown in FIG. 4K, the device 102 may add "$" indicating an end of the read to a last entry of the read base information field.

In an embodiment, the device 102 may generate the pileup string 402*b* by performing the first to tenth steps described with reference to FIGS. 4B to 4K.

Figure 5:
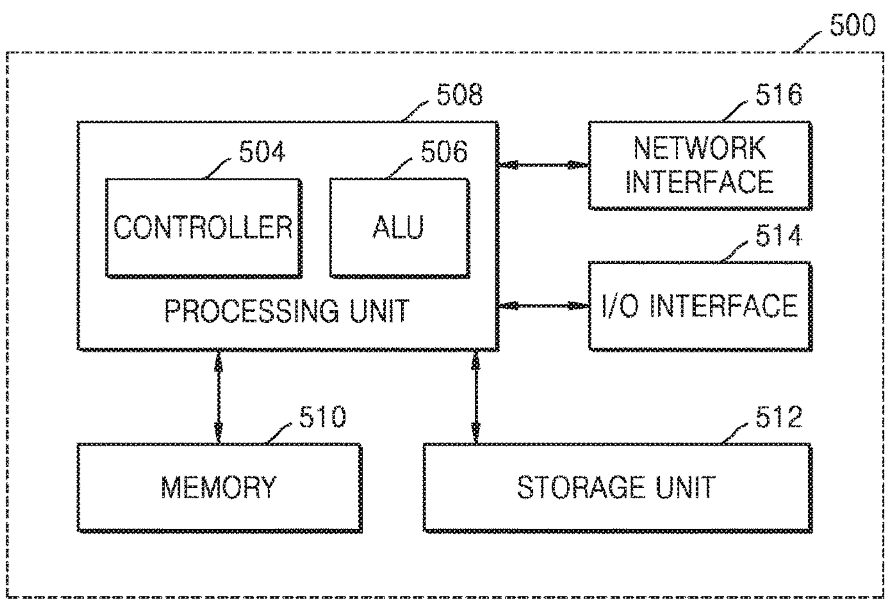
FIG. 5 is a diagram of a computing device for generating a pileup file from a reference based compression file, according to an embodiment.

FIG. 5 is a diagram of a computing device 500 for generating a pileup file from a reference-based compression file, according to an embodiment. Referring to FIG. 5, the computing device 500 may include a processing unit 508 including a controller 504 and an arithmetic logic unit (ALU) 506, a memory 510, a storage unit 512, an I/O interface 514, and a network interface 516.

Also, the processing unit 508 may process instructions of an algorithm. The processing unit 508 may receive commands from the controller 504 to perform processing. Also, any logical and arithmetic operations involved in the execution of the instructions may be performed by the ALU 506.

The computing device 500 according to an embodiment may include a plurality of homogenous and/or heterogeneous cores, different types of central processing units (CPUs), special media, and other accelerators. The processing unit 508 may be implemented as a single chip or a plurality of chips, but is not limited thereto.

An algorithm including instructions and codes required for execution may be stored in the memory 510, the storage unit 512, or both. At the time of execution, the instructions may be fetched from the memory 510 or the storage unit 512, and executed by the processing unit 508.

In the case of random hardware devices, the computing device 500 may be connected to various devices via the network interface 516. Commands may be received from a user or processing results of the computing device 500 may be transmitted to the user via the I/O interface 514.

The embodiments disclosed herein can be implemented through at least one software program running on at least one hardware device and performing network management functions to control the various components or elements. The components shown in the FIGS. 1 to 5 include blocks which can be at least one of a hardware device, or a combination of a hardware device and a software module.

The method of generating the pileup file according to the embodiments may be embodied as computer-readable code on a computer-readable recording medium. The computer-readable recording medium is any data storage device that can store programs or data which can be thereafter read by a computer system. Examples of the computer-readable recording medium include read-only memory (ROM), random-access memory (RAM), CD-ROMs, magnetic tapes, hard disks, floppy disks, flash memory, optical data storage devices, and the like. The computer-readable recording medium can also be distributed over network coupled computer systems so that the computer-readable code is stored and executed in a distributive manner.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A computer-implemented method of generating a pileup file, the method comprising the steps, implemented in a processor, of:

receiving a reference based compression file comprising a plurality of pieces of read data that are compressed;

partially decompressing the plurality of pieces of read data to acquire a differential string associated with the plurality of pieces of read data; and generating the pileup file by decoding the differential string based on a plurality of conversion rules, by:

determining, from among a plurality of segments of the differential string, whether a position of a segment that is processed to generate the pileup file is a first position; and upon determining that the position of the segment is the first position, inserting a start position of one of the plurality of pieces of read data in a position field of the pileup file, inserting a base of a reference corresponding to the start position in a reference field of the pileup file, inserting, in a read base information field of the pileup file, a first symbol indicating a start of the one of the plurality of pieces of read data, and inserting a quality value of the one of the plurality of pieces of read data as an ASCII value of a read quality incremented by a predefined value.

2. The method of claim 1, wherein the pileup file comprises a plurality of fields corresponding to the differential string, and the plurality of fields comprise a position field, a reference field, a read base information field, and a quality information field.

3. The method of claim 1, wherein the generating the pileup file by decoding the differential string based on a plurality of conversion rules comprises:

upon determining that the position of the segment is not the first position, identifying an indicator in the segment;

processing the segment based on the indicator identified in the segment; and marking an internal state with regard to the processed segment.

4. The method of claim 3, wherein the generating of the pileup file further comprises inserting, when all of the plurality of segments in the differential string are processed, a second symbol indicating an end of the plurality of pieces of read data in a read base information field.

5. The method of claim 3, wherein the indicator comprises one of a soft-clipping indicator, a substitution indicator, a deletion indicator, and an insertion indicator.

6. An apparatus for generating a pileup file, the apparatus comprising:

a memory configured to store at least one instruction; and a processor configured to execute the at least one instruction stored in the memory, wherein execution of the at least one instruction causes the processor to receive a reference based compression file comprising a plurality of pieces of read data that are compressed, partially decompress the plurality of pieces of read data to acquire a differential string associated with the plurality of pieces of read data, and generate the pileup file by decoding the differential string based on a plurality of conversion rules;

wherein the processor further configured to determine, from among a plurality of segments of the differential string, whether a position of a segment that is processed to generate the pileup file is a first position, and upon determination that the position of the segment is the first position, insert a start position of one of the plurality of pieces of read data in a position field of the pileup file, insert a base of a reference corresponding to the start position in a reference field of the pileup file, insert, in a read base information field of the pileup file, a first symbol indicating a start of the one of the plurality of pieces of read data, and insert a quality value of the one of the plurality of pieces of read data as an ASCII value of a read quality incremented by a predefined value.

7. The apparatus of claim 6, wherein the pileup file comprises a plurality of fields corresponding to the differential string, and the plurality of fields comprise a position field, a reference field, a read base information field, and a quality information field.

8. The apparatus of claim 6, wherein upon determination that the position of the segment is not the first position execution of the at least one instruction causes the processor i to identify an indicator in the segment, process the segment based on the indicator identified in the segment, and mark an internal state with regard to the processed segment.

9. The apparatus of claim 8, wherein execution of the at least one instruction causes the processor to insert, when all of the plurality of segments in the differential string are processed, a second symbol indicating an end of the one of the plurality of pieces of read data in a read base information field.

10. The apparatus of claim 8, wherein the indicator comprises one of a soft-clipping indicator, a substitution indicator, a deletion indicator, and an insertion indicator.

11. A non-transitory computer-readable recording medium having recorded thereon a program, which, when executed by a computer, performs the steps of:

receiving a reference based compression file comprising a plurality of pieces of read data that are compressed;

partially decompressing the plurality of pieces of read data to acquire a differential string associated with the plurality of pieces of read data; and generating the pileup file by decoding the differential string based on a plurality of conversion rules; by:

determining, from among a plurality of segments of the differential string, whether a position of a segment that is processed to generate the pileup file is a first position; and upon determining that the position of the segment is the first position, inserting a start position of one of the plurality of pieces of read data in a position field of the pileup file, inserting a base of a reference corresponding to the start position in a reference field of the pileup file, inserting, in a read base information field of the pileup file, a first symbol indicating a start of the one of the plurality of pieces of read data, and inserting a quality value of the one of the plurality of pieces of read data as an ASCII value of a read quality incremented by a predefined value.

12. The non-transitory computer-readable recording medium of claim 11, wherein the pileup file comprises a plurality of fields corresponding to the differential string, and the plurality of fields comprise a position field, a reference field, a read base information field, and a quality information field.

13. The non-transitory computer-readable recording medium of claim 11, wherein the generating the pileup file by decoding the differential string based on a plurality of conversion rules comprises:

upon determining that the position of the segment is not the first position, identifying an indicator in the segment, processing the segment based on the indicator identified in the segment, and marking an internal state with regard to the processed segment.

14. The non-transitory computer-readable recording medium of claim 13, wherein the generating of the pileup file further comprises inserting, when all of the plurality of segments in the differential string are processed, a second symbol indicating an end of the plurality of pieces of read data in a read base information field.

* * * * *